United States Patent
Fujita et al.

(10) Patent No.: US 10,513,065 B2
(45) Date of Patent: Dec. 24, 2019

(54) METHOD FOR PRODUCING WATER JACKET SPACER

(71) Applicant: NICHIAS CORPORATION, Tokyo (JP)

(72) Inventors: Yoshifumi Fujita, Tokyo (JP); Shota Uchida, Tokyo (JP); Kenichi Nakamura, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 239 days.

(21) Appl. No.: 15/307,156

(22) PCT Filed: Apr. 28, 2015

(86) PCT No.: PCT/JP2015/002275
§ 371 (c)(1),
(2) Date: Oct. 27, 2016

(87) PCT Pub. No.: WO2015/166660
PCT Pub. Date: Nov. 5, 2015

(65) Prior Publication Data
US 2017/0043513 A1    Feb. 16, 2017

(30) Foreign Application Priority Data

Apr. 30, 2014  (JP) ................. 2014-093697
Jan. 16, 2015  (JP) ................. 2015-006451

(51) Int. Cl.
*B29C 45/00*  (2006.01)
*B29C 45/27*  (2006.01)
(Continued)

(52) U.S. Cl.
CPC ........ *B29C 45/0025* (2013.01); *B29C 37/005* (2013.01); *B29C 45/27* (2013.01);
(Continued)

(58) Field of Classification Search
None
See application file for complete search history.

(56) References Cited

U.S. PATENT DOCUMENTS

| 4,958,633 A | 9/1990 | Angell |
| 8,474,418 B2 | 7/2013 | Shikida et al. |

(Continued)

FOREIGN PATENT DOCUMENTS

| CN | 101490379 A | 7/2009 |
| CN | 102606334 A | 7/2012 |

(Continued)

OTHER PUBLICATIONS

Zhai, Ming et al. A study of gate location optimization of plastic injection molding using sequential linear programming. Int. J. Adv. Manuf Technol (2010) 49:97-103 (Year: 2010).*

(Continued)

*Primary Examiner* — David P Turocy
(74) *Attorney, Agent, or Firm* — Oliff PLC (57) ABSTRACT

A spacer (1) is injection molded by using an injection molding die having resin flow channels that are designed such that a plurality of gates (6) are arranged along the longitudinal direction at a position corresponding to the outer peripheral surface of a side wall part (4) in which a plurality of arc-like peripheral surface parts (2) are connected through a waist part (3). After opening the mold and ejecting the spacer, the spacer is cooled with a runner (7) being connected to the gate (6), and thereafter, the runner (7) is cut off. As a result, when producing a water jacket spacer that is assembled to the inside of the water jacket and controls the flow of cooling water by injection molding, while producing with a high productivity without being affected by design constraints caused by draft angle, deformation in the post-molding cooling step is prevented.

5 Claims, 10 Drawing Sheets

(51) Int. Cl.
*B29C 37/00* (2006.01)
*F02F 1/14* (2006.01)
*B29C 45/72* (2006.01)
*B29K 23/00* (2006.01)
*B29K 77/00* (2006.01)
*B29K 81/00* (2006.01)
*B29L 31/00* (2006.01)
*B29C 33/00* (2006.01)

(52) U.S. Cl.
CPC ...... B29C 45/2708 (2013.01); *B29C 33/0066* (2013.01); *B29C 45/006* (2013.01); *B29C 45/7207* (2013.01); *B29C 2045/0027* (2013.01); *B29C 2045/0034* (2013.01); *B29C 2045/0086* (2013.01); *B29C 2793/009* (2013.01); *B29K 2023/12* (2013.01); *B29K 2077/00* (2013.01); *B29K 2081/04* (2013.01); *B29L 2031/749* (2013.01); *F02F 1/14* (2013.01)

(56) References Cited

U.S. PATENT DOCUMENTS

| | | | | |
|---|---|---|---|---|
| 2005/0120653 | A1* | 6/2005 | Okazaki | B29C 37/005 52/302.1 |
| 2006/0180153 | A1 | 8/2006 | Schaub et al. | |
| 2009/0315215 | A1* | 12/2009 | Uebayashi | B29C 33/0066 264/299 |
| 2010/0242868 | A1* | 9/2010 | Shikida | F01P 3/02 123/41.79 |
| 2010/0258131 | A1 | 10/2010 | Gaffney et al. | |
| 2011/0114041 | A1 | 5/2011 | Hamakawa et al. | |
| 2012/0132157 | A1 | 5/2012 | Matsuki et al. | |

FOREIGN PATENT DOCUMENTS

| | | | |
|---|---|---|---|
| EP | 2 049 783 | | 4/2009 |
| EP | 2 325 471 | A1 | 5/2011 |
| JP | 61-131764 | A | 6/1986 |
| JP | 6-173675 | A | 6/1994 |
| JP | 2005-105878 | A | 4/2005 |
| JP | 2005-120949 | A | 5/2005 |
| JP | 2012-036742 | A | 2/2012 |
| WO | 2008/016127 | A1 | 2/2008 |

OTHER PUBLICATIONS

International Preliminary Report on Patentability issued in corresponding application PCT/JP2015/002275, issued Nov. 1, 2016 and dated Nov. 10, 2016.
International Search Report issued in corresponding application PCT/JP2015/002275, completed Jul. 28, 2015 and dated Aug. 11, 2015.
Extended European Search Report issued in corresponding application 15785220.3 completed Sep. 12, 2017 and dated Sep. 29, 2017.
Office Action issued in corresponding Japanese application 2013-031954 dated Apr. 13, 2017, with English language summary.

* cited by examiner

METHOD FOR PRODUCING WATER JACKET SPACER

This is a National Phase Application in the United States of International Patent Application No. PCT/JP2015/002275 filed Apr. 28, 2015, which claims priority on Japanese Patent Application Nos. 2014-093697, filed Apr. 30, 2014, and 2015-006451, filed Jan. 16, 2015. The entire disclosures of the above patent applications are hereby incorporated by reference.

TECHNICAL FIELD

The present invention relates to a method for producing a water jacket spacer that is assembled into the inside of a water jacket provided in a water-cooled internal combustion engine.

BACKGROUND ART

In a water-cooled internal combustion engine such as a water-cooled engine for automobiles, a water jacket serving as a cooling water-circulating channel is formed around a bore wall of a cylinder bore. Normally, by inserting and assembling a spacer (water jacket spacer) into the inside of such a water jacket, flow of cooling water is controlled.

Such a water jacket spacer is generally produced by injection molding by using a prescribed resin material. Patent Document 1 proposes a method in which, in order to prevent deformation of a water jacket spacer in a post-molding cooling step without using a jig for correcting the shape, the opposing parts of the cylindrical main body of the spacer to be inserted into a water jacket are connected by a connecting bride, the shape of the spacer is retained after molding, and then the connecting bridge is cut off.

RELATED ART DOCUMENT

Patent Document

Patent Document 1: JP-A-2005-105878

SUMMARY OF THE INVENTION

Problems to be Solved by the Invention

Figure 12:
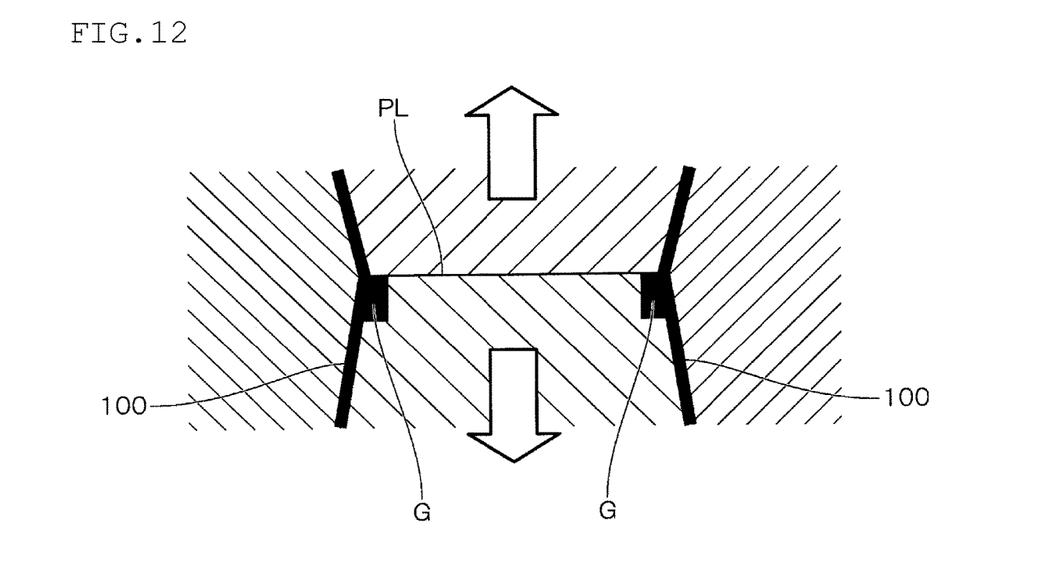
FIG. 12 is a schematic view explaining problems associated with the conventional technology.

However, in the method of Patent Document 1, a runner for introducing a molten resin into a gate is used as the connecting bridge. As for the mold structure in this case, as shown in FIG. 12, a mold piece forming the inner surface of a space 100 is allowed to be a split, and gate G is arranged at the parting line PL thereof.

Figure 13:
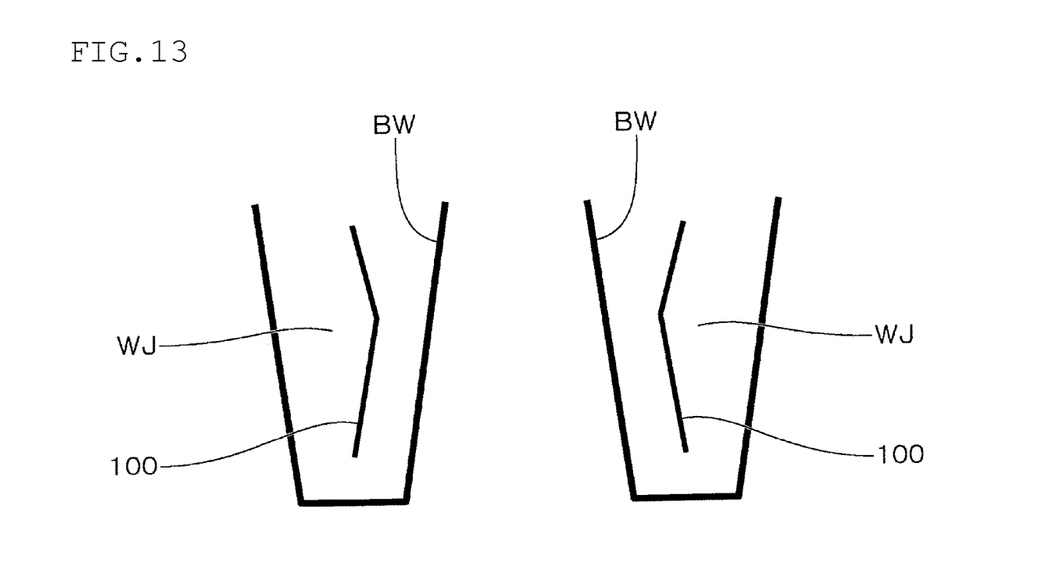
FIG. 13 is a schematic view explaining problems associated with the conventional technology.

By doing so, on the inner peripheral surface of the spacer 100, taking mold opening into consideration, it is required to provide draft angle in which inclination direction is different in the opposite sides of the parting line PL along a mold opening direction shown by an arrow in the figure. Therefore, as shown in FIG. 13, when assembling the spacer 100 into the inside of the water jacket WJ, it becomes impossible to allow the inner peripheral surfaces of the spacer 100 to be opposed to the wall surface of the water jacket WJ along the inclination thereof. As a result, the gap between the upper side of the bore wall BW and the spacer 100 may be widened, etc., and the cooling water may be stagnated, resulting in lowering in cooling efficiency. Therefore, the shape of the spacer has to be designed taking constraints caused by draft angle into consideration.

Further, generally, in order to keep the bore wall warm, as for the gap between the wall surface of the water jacket and the spacer, in many cases, a gap formed on the inner peripheral side of the spacer when assembled into the water jacket is designed to be narrower than a gap formed on the outer peripheral side of the spacer. Therefore, in the method of Patent Document 1, a problem arises that severe management is required to be conducted for burrs that remain on the inner surface of the spacer main body after gate cutting or for burrs that are formed along the parting line.

Further, when the connecting bridge that connects the opposing parts of the spacer main body is cut, tools for this cutting have to be inserted into the inside of the spacer main body, and as a result, handling of the tools has to be contrived in order that the tools do not interfere with the spacer main body.

The present invention has been made taking the above circumferences into consideration, and is aimed at providing a method for producing a water jacket spacer in which, when producing by injection molding a water jacket spacer that is assembled into the inside of a water jacket and controls the flow of cooling water while producing with a high productivity without being affected by design constraints caused by draft angle, deformation in the post-molding cooling step can be prevented.

Means for Solving the Problems

The method for producing a water jacket spacer according to the present invention is a method for producing a water jacket spacer that is assembled into the inside of a water jacket provided in a water-cooled internal combustion engine in order to control the flow of cooling water, wherein the water jacket spacer has a side wall part in which a plurality of arc-like peripheral surface parts are connected through a waist part;

a prescribed resin material is injection molded by using a molding die for injection molding in which resin flow channels are designed so that a plurality of gates are arranged along the longitudinal direction at a position corresponding to the outer peripheral surface of the side wall part; and after mold opening and ejecting, cooling is done while leaving a runner being connected to the gates, and thereafter, the runner is cut off.

Advantageous Effects of the Invention

According to the present invention, when producing a water jacket spacer by injection molding, while producing the water jacket spacer with a high productivity without being affected by design constraints caused by draft angle, deformation of the water jacket spacer in the post-molding cooling step can be prevented.

MODE FOR CARRYING OUT THE INVENTION

Hereinbelow, an explanation will be made on the embodiment of the method for producing a water jacket spacer according to the present invention with reference to the drawings.

Figure 3:
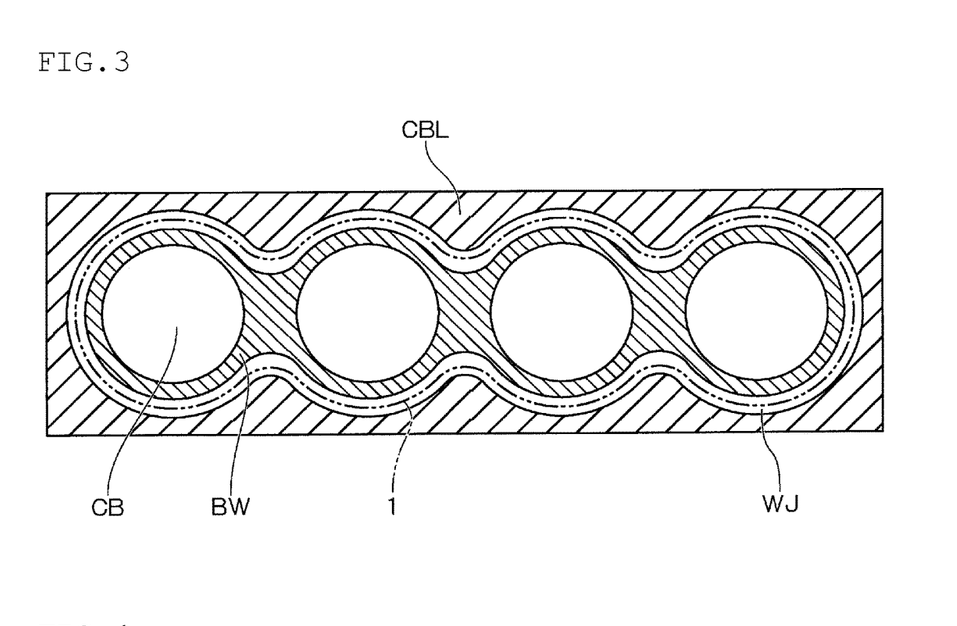
FIG. 3 is an explanatory view showing one example of an internal combustion engine to which a water jacket spacer that is produced by the embodiment of the present invention is assembled.

As shown in FIG. 3, a spacer 1 that is produced by the present embodiment is assembled into the inside of the water jacket WJ provided in a water-cooled inline-four engine for an automobile in which a cylinder block CBL and a cylinder head (not shown) are provided, and four cylinder bores CB arranged in series are formed in the cylinder block CBL.

FIG. 3 is an explanatory view showing one example of a water-cooled internal combustion engine into which the spacer 1 is assembled. In FIG. 3, the spacer 1 is indicated by an alternate long and two short dashed line.

In the cylinder block CBL, the bore walls BW of a plurality (four in the shown example) of cylinder bores CB are formed such that they are connected to each other in a constricted manner between the adjacent cylinder bores CB to form an integral body, and, in the periphery of such bore wall BW, a water jacket WJ as the circulating channel for cooling water is formed.

The spacer 1 has a shape that can be inserted into the inside of the water jacket WJ, and is formed such that it can extend along the bore wall BW having a constricted shape between the adjacent cylinder bores CB. Although, normally, the spacer 1 has a shape in which a plurality (four in the shown example) of cylindrical parts are integrally connected through waists part having the similar constricted shape in a hollow shape, the specific shape thereof is not particularly restricted. The spacer 1 can be appropriately designed such that, by assembling by insertion into the inside of the water jacket WJ, the spacer 1 controls the flow of cooling water that flows inside the water jacket WJ, whereby the temperature distribution of the bore wall BW can be optimized. For example, in addition to the shape insertable along the entire circumference of the water jacket WJ, it can have a shape that it is partially insertable into the inside of the water jacket WJ.

Figure 1:
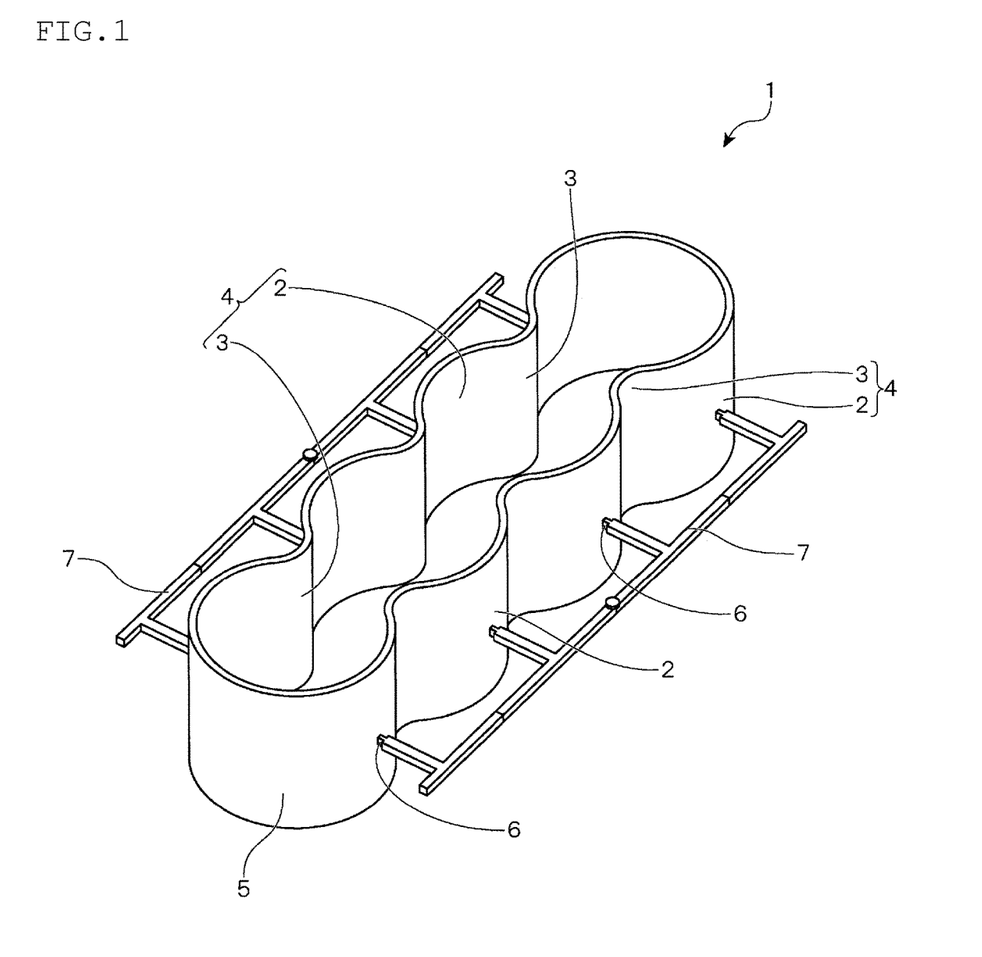
FIG. 1 is a perspective view showing an outline of one example of a water jacket spacer produced by the embodiment of the present invention.
Figure 2:
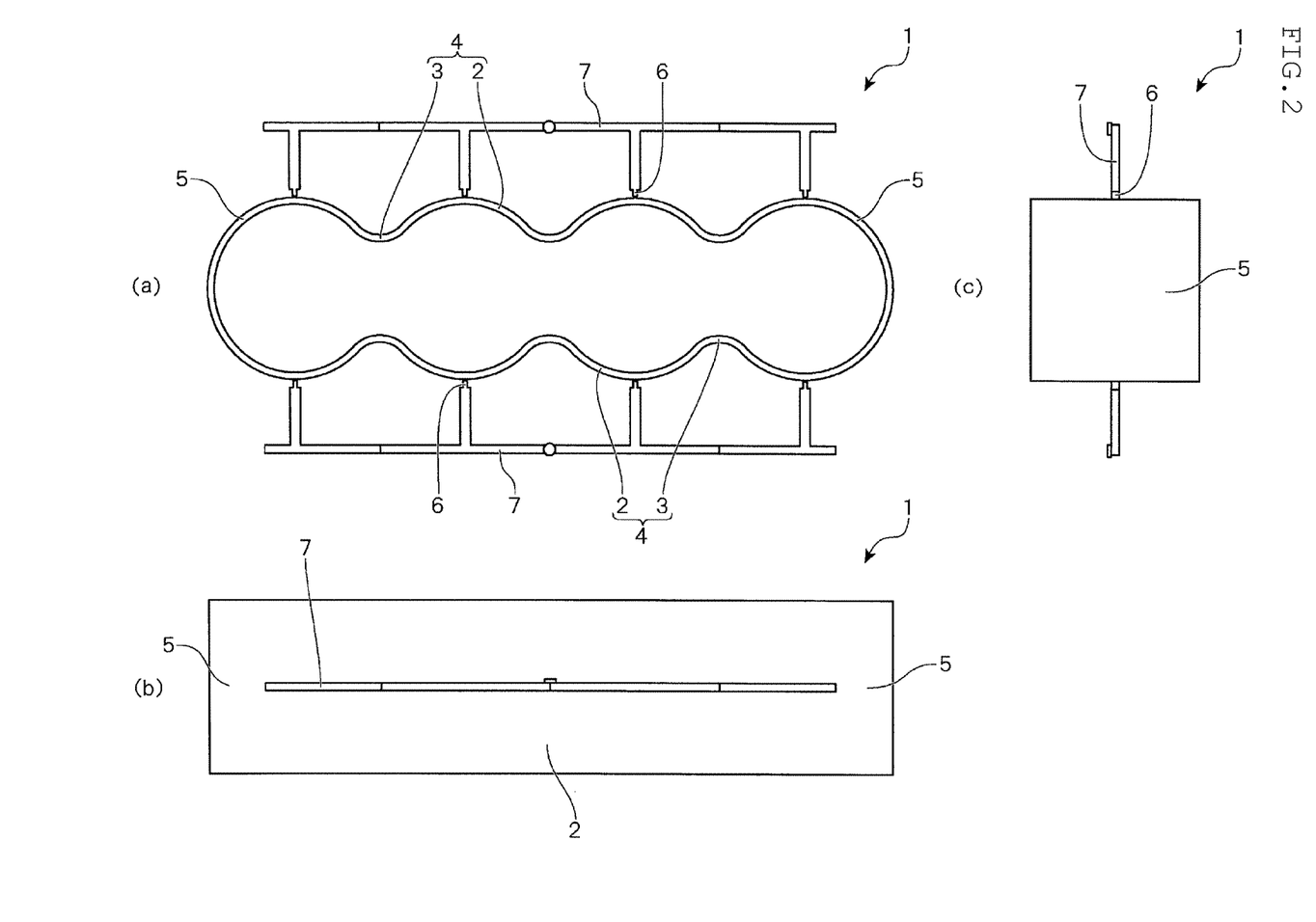
FIG. 2 is an explanatory view showing an outline of a water jacket spacer that is produced by the embodiment of the present invention, in which (a) is a plan view; (b) is a front view; and (c) is a side view.

The schematic shape of the spacer 1 produced in the present embodiment is shown in FIG. 1 and FIG. 2. In the spacer 1, side wall parts 4 in which a plurality of arc-like peripheral surface parts 2 are connected adjacently through the waist part 3 are arranged opposingly, and are connected to arc-like end surface parts 5 at the both ends in the longitudinal direction. The spacer 1 having such a shape is molded by subjecting a prescribed resin material to injection molding by using an injection molding die in which a resin flow channel is designed such that a plurality of gates 6 serving as an inlet for a resin material to be filled in a cavity are arranged along the longitudinal direction at a position corresponding to the outer peripheral surface of the side wall part 4.

Then, after opening the injection molding die and ejecting the molded spacer 1, the spacer is cooled while leaving the runners 7 that are continued to the gate 6 in the shape of the teeth of a comb. Thereafter, the runner 7 is cut off.

By doing so, the runner 7 connected to the outer peripheral surface of the side wall 4 of the spacer 1 in the shape of the teeth of a comb suppresses deformation of the spacer 1 in a softened state immediately after the ejection, whereby the shape of the spacer 1 during a period for which the spacer 1 is cooled and solidified can be retained. The runner 7 that is connected to the side wall part 4 of the spacer 1 in the shape of the teeth of a comb is cut off after the spacer 1 is fully solidified and there is no fear of deformation.

Figure 4:
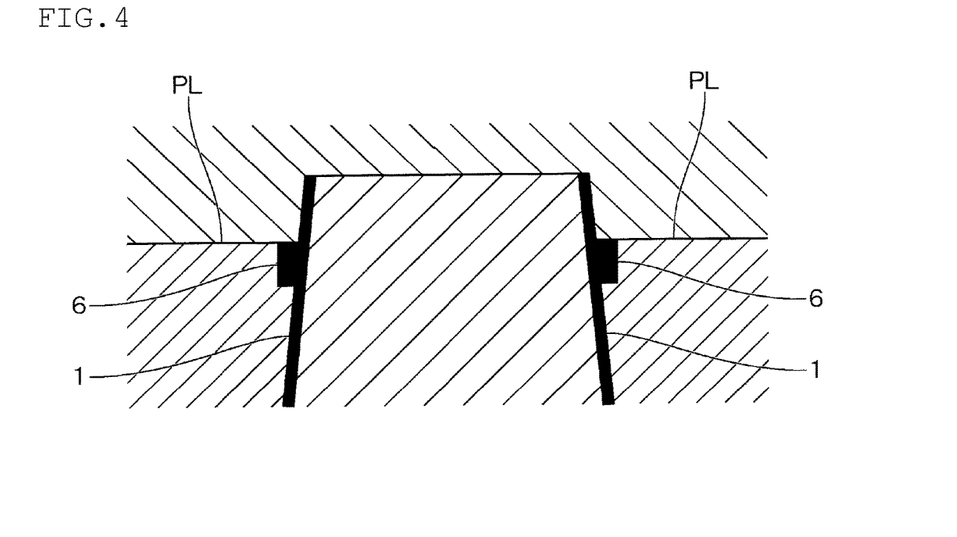
FIG. 4 is a schematic view showing one example of a molding die used in the present embodiment.

As mentioned above, in the present embodiment, by using the runner 7 that is formed in the resin flow channel at the time of injection molding, the shape of the spacer 1 after the molding is retained. Since the gate 6 is arranged at a position corresponding to the outer peripheral surface of the side wall part, as shown in FIG. 4, it is not necessary to allow the mold piece forming the inner peripheral surface of the spacer 1 to be a split. Therefore, draft angle of the inner peripheral surface of the spacer 1 can be a fixed angle along the mold-opening direction.

FIG. 4 is a schematic view showing one example of a molding die used in the present embodiment.

Figure 5:
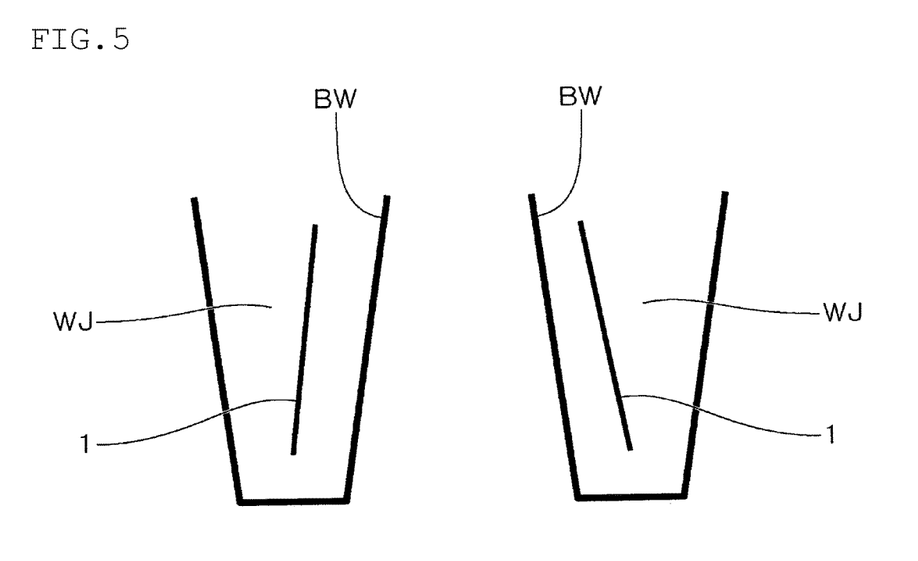
FIG. 5 is a schematic view showing an example in which a water jacket spacer that is produced by the embodiment of the present invention is assembled into a water jacket.

Therefore, when the spacer 1 is assembled into the water jacket WJ, as shown in FIG. 5, the inner peripheral surfaces of the spacer 1 can be opposed to the wall of the water jacket WJ along the inclination thereof. As a result, flow of cooling water can be controlled smoothly without causing stagnation of the cooling water, whereby constraints caused by draft angle when designing the spacer 1 such that the temperature distribution of the bore wall BW can be optimized can be relaxed.

FIG. 5 is a schematic view showing an example in which the spacer 1 produced in the present embodiment is assembled to the water jacket WJ.

Further, since burrs remaining in the spacer 1 after cutting the gate and burrs that are formed along the parting line PL are not formed on the inner peripheral surface side of the spacer 1, control thereof becomes facilitated.

Further, since gate cutting is conducted on the outer peripheral surface side of the spacer 1, handling of tools used therefor is facilitated.

As mentioned above, according to the present embodiment, when producing the spacer 1 by injection molding, while producing the spacer 1 with a high productivity without being affected by design constraints caused by draft angle, deformation of the spacer 1 in the post-molding cooling step can be prevented.

Figure 6:
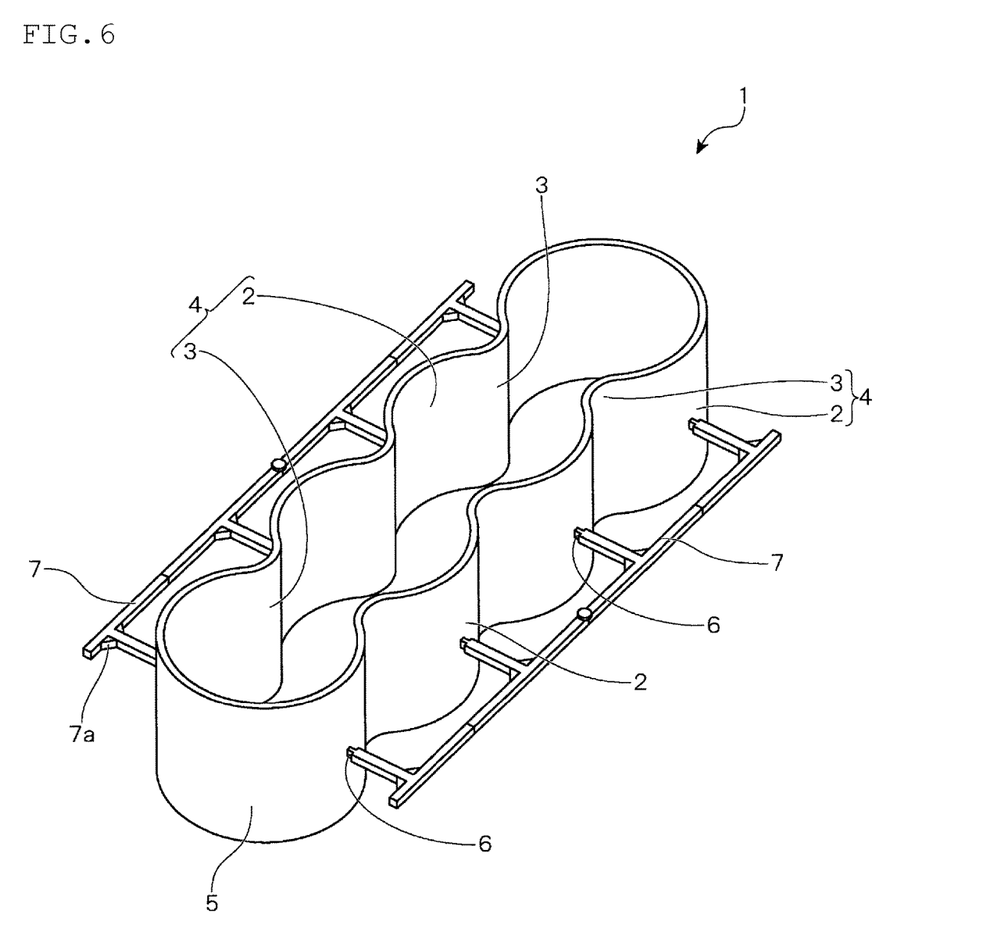
FIG. 6 is a perspective view showing an outline of another example of a water jacket spacer that is produced by the embodiment of the present invention.

Another example of the spacer 1 produced in the present embodiment is shown in FIG. 6. When retaining the shape of the spacer 1 by the runner 7 connected to the side wall part 4 of the spacer 1 in the shape of the teeth of a comb, in the branched part of the runner 7, a reinforcing part 7a in the shape of a brace can be formed.

Further, in the examples shown in FIG. 1 and FIG. 2, the gate 6 is arranged at a position corresponding to the middle of the height direction of the side wall part 4 of the spacer 1. By doing so, deformation of the spacer 1 in the post-molding cooling step can be effectively prevented. As long as the shape of the spacer 1 can be retained, the position of the side wall 4 in the height direction at which the gate 6 is arranged is not restricted thereto.

In the examples shown in FIG. 1 and FIG. 2, the gate 6 is arranged at a position corresponding to the arc-like peripheral surface part 2 of the side wall part 4. By doing so, lowering in resin pressure hardly occurs in the vicinity of the outlet of the gate 6, and as a result, insufficient filling can be suppressed. On the other hand, there is a concern that insufficient flow such as formation of weld lines occurs in the waist part 3. Therefore, when it is necessary to avoid occurrence of insufficient flow such as formation of weld lines in the waist part 3, the gate part 6 may be arranged at a position corresponding to the waist part 3 of the side wall part 4. The position at which the gate 6 is arranged can be appropriately designed in respect of molding properties taking into consideration flow of a resin. According to need, the gate 6 may be arranged at both a position corresponding to the arc-like peripheral surface part 2 and a position corresponding to the waist part 3 of the side wall part 4.

In the present embodiment, no restrictions are imposed on a resin material. Polypropylene, polyamide, polyphenylsulfone or the like can be given, for example. A resin material that is excellent in heat resistance, moisture resistance, anti-freezer resistance, wear resistance or the like can be appropriately selected.

Figure 7:
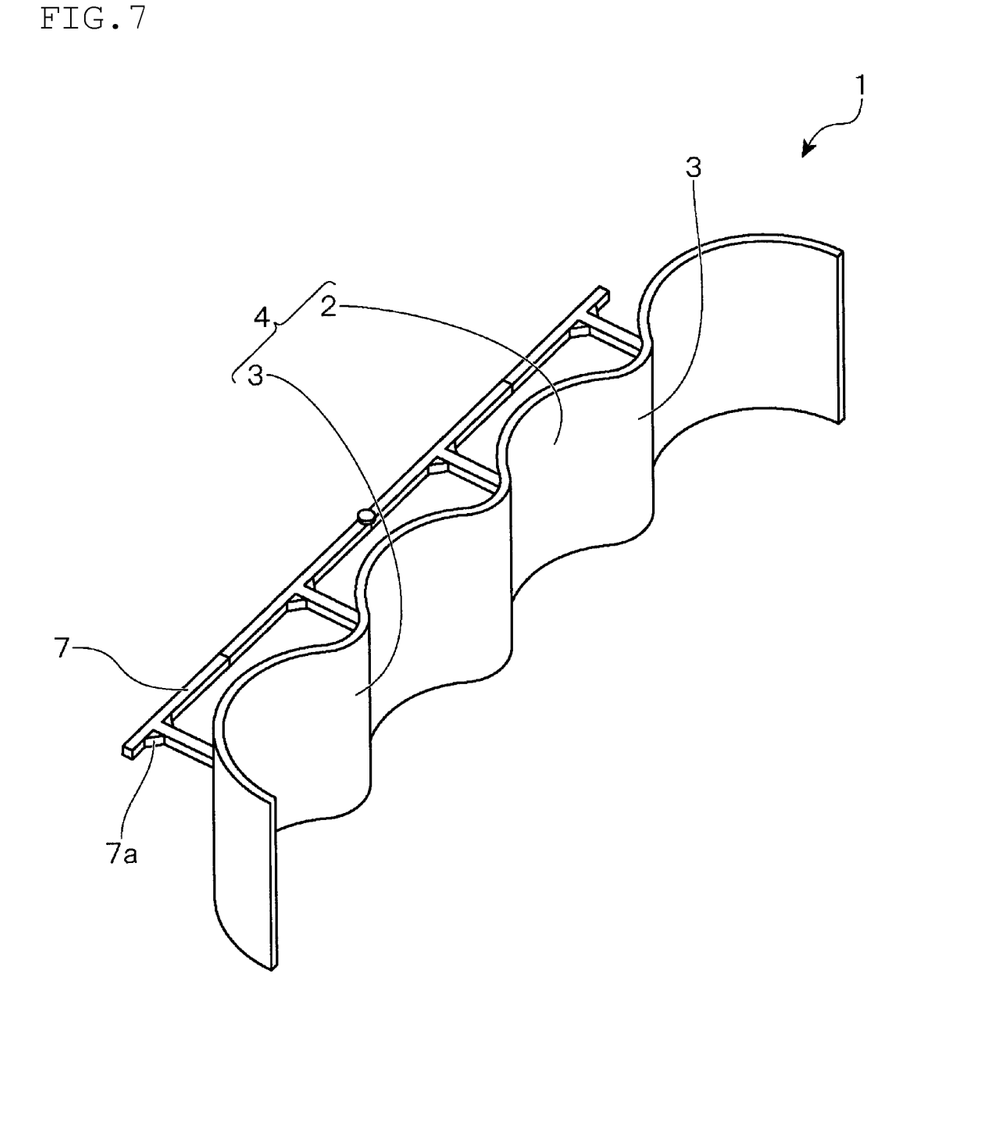
FIG. 7 is a perspective view showing an outline of another example of a water jacket spacer that is produced by the embodiment of the present invention.
Figure 8:
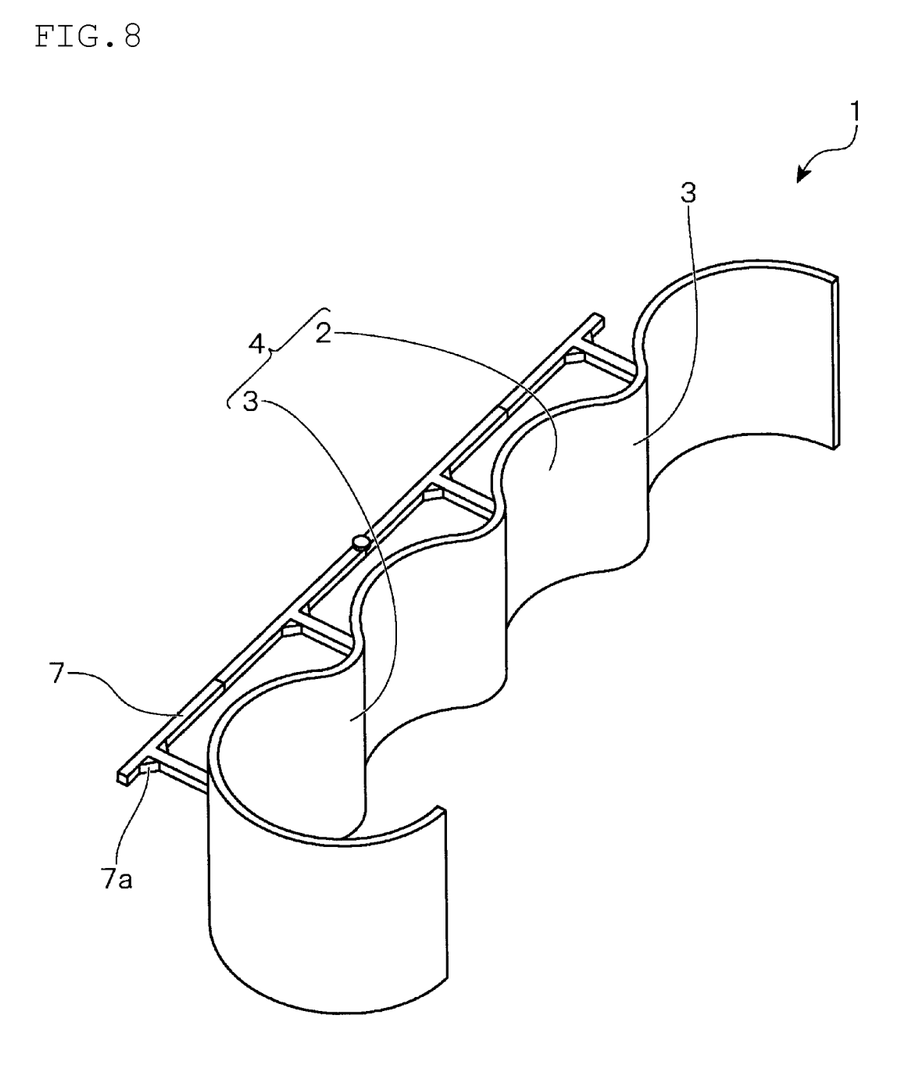
FIG. 8 is a perspective view showing an outline of another example of a water jacket spacer that is produced by the embodiment of the present invention.

As mentioned above, the spacer 1 can have a shape that is partially insertable into the inside of the water jacket WJ. For example, when the spacer 1 is assembled to a part of the side from which cooling water is flown to the water jacket WJ and the spacer 1 is not assembled to the side from which the cooling water is discharged from the water jacket WJ, if the spacer 1 has a shape having the side wall part 4 in which a plurality of the arc-like peripheral surface parts 2 are connected through the waist part 3 (see FIG. 7 and FIG. 8), deformation of the spacer 1 having such a shape in the post-molding cooling step can be suppressed.

Hereinabove, the present invention has been explained with reference to the preferable embodiment. However, the present invention is not restricted to the above-mentioned preferable embodiment, and it is needless to say that various modifications are possible within the scope of the present invention.

For example, in the above-mentioned embodiment, an explanation was made taking as an example a water jacket spacer used in a water-cooled inline-four engine for an automobile. The present invention can be applied to an inline multi-cylinder engine such as an inline-three engine. In addition, not only the inline engine, the present invention can be applied to a V-shaped engine and a horizontally-opposed engine. That is, the present invention can be widely applied to a water-cooled internal combustion engine provided with a water jacket.

Modification Example

Figure 9:
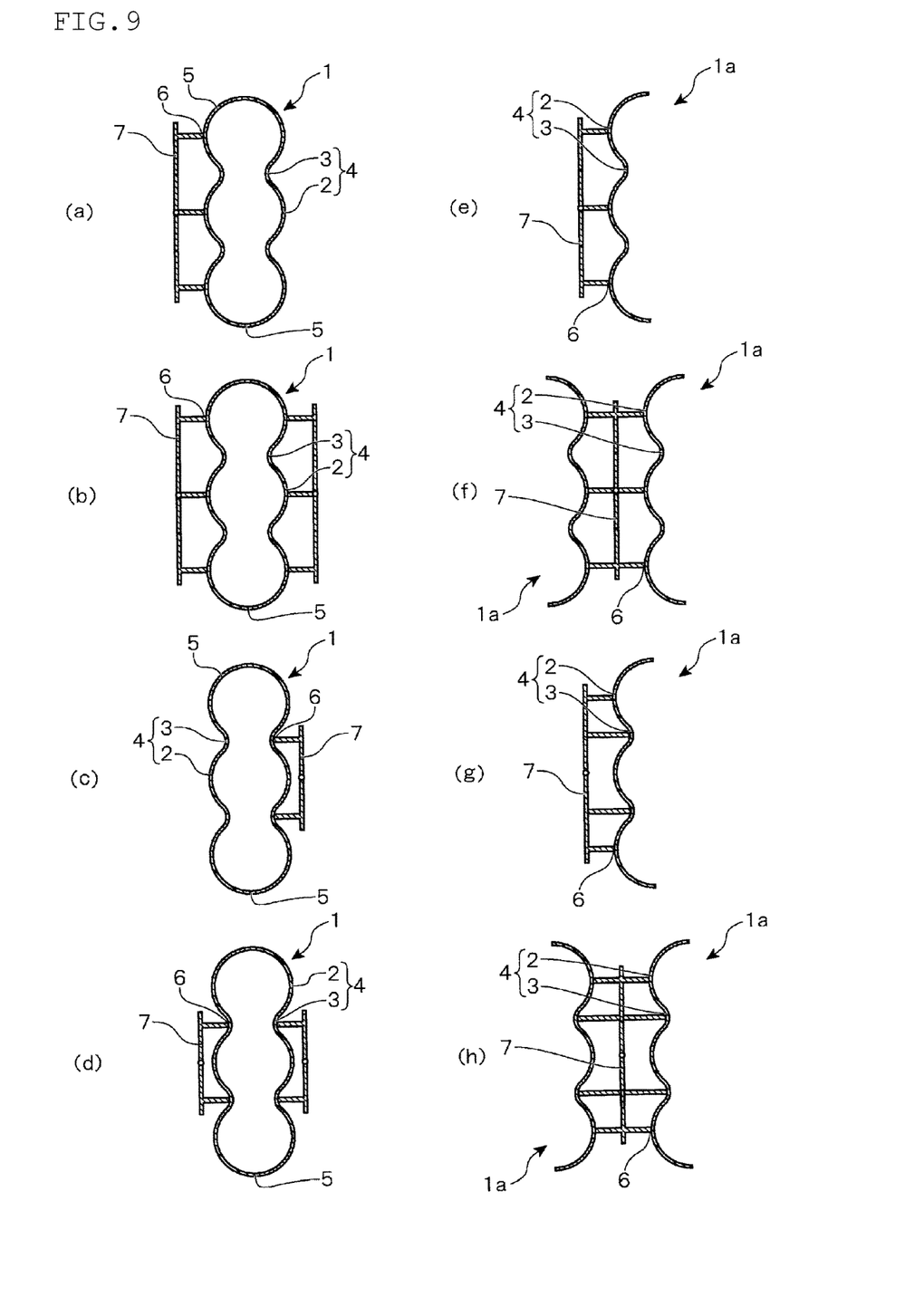
FIG. 9 is an explanatory view showing a modification example of the present invention.

The modification example of the present invention will be explained with reference to FIG. 9.

FIGS. 9(a) to (d) each show a modification example in which the present invention is applied to an inline-three engine. In the spacer 1, side wall parts 4 in which three arc-like peripheral surface parts 2 are connected adjacently through the waist part 3 are arranged opposingly, and are connected to the arc-like end surface part 5 at the both ends in the longitudinal direction.

FIG. 9(a) shows an example in which a gate is arranged along the longitudinal direction at a position corresponding to the arc-like peripheral surface part 2 of one of the side wall parts 4 arranged opposingly, and the runner 7 is connected to one of the side wall parts 4 in the form of the teeth of a comb. FIG. 9(b) shows an example in which the gate 6 is arranged along the longitudinal direction at a position corresponding to the arc-like peripheral surface part 2 of the both side wall parts 4 arranged opposingly, and the runner 7 is connected to the both side wall parts 4 in the shape of the teeth of a comb.

FIG. 9(c) shows an example in which a gate is arranged along the longitudinal direction at a position corresponding to the waist part 3 of one of the side wall parts 4 arranged opposingly, and the runner 7 is connected to one of the side wall parts 4 in the shape of the teeth of a comb. FIG. 9(d) shows an example in which the gates 6 are arranged along the longitudinal direction at a position corresponding to the waist part 3 of both of the side wall parts 4 that are arranged opposingly, and the runner 7 is connected to the both side wall parts 4 in the shape of the teeth of a comb.

Figure 10:
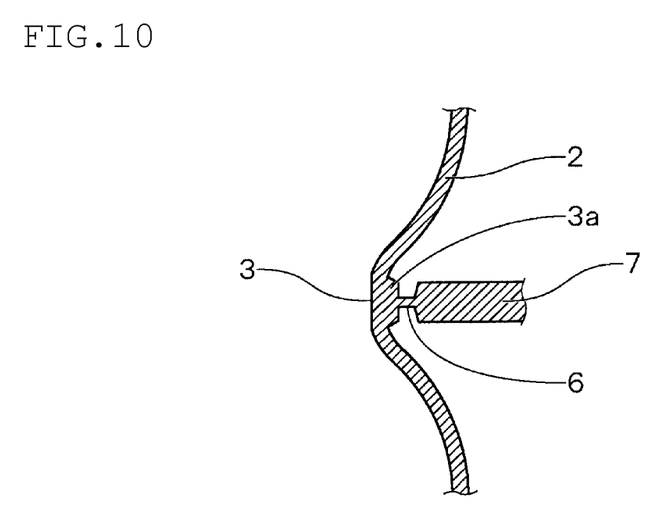
FIG. 10 is an explanatory enlarged view of essential parts of a modification example of the present invention in which a gate is arranged at a waist part.

When arranging a gate at a position corresponding to the waist part 3, as shown in FIG. 10, by allowing the inner peripheral side of the side wall part of the waist part 3 to be plane and by allowing the gate 6 to be connected to the outer peripheral side of the side wall part through a pedestal 3a, a gate cutting treatment can be facilitated.

Further, FIGS. 9(e) to (h) each show an example in which divided molded products 1a are obtained by dividing the spacer 1 into two along the longitudinal direction, and the two divided molded products 1a are combined to obtain the spacer 1.

FIG. 9(e) shows an example in which a gate is arranged along the longitudinal direction at a position corresponding to the outer peripheral surface of the arc-like peripheral surface part 2 of the side wall part 4 of the divided molded products 1a, and the runner 7 is connected in the shape of the teeth of a comb. In such an example, as shown in FIG. 9(f), two divided molded products 1a can be obtained.

FIG. 9(g) shows an example in which a gate is arranged along the longitudinal direction at a position corresponding to the arc-like peripheral surface part 2 of the both end sides of the side wall par 4 and at a position corresponding to the outer peripheral surface of the waist part 3 of the divided molded products 1a, and the runner 7 is connected in the shape of the teeth of a comb. In such an example, as shown in FIG. 9(h), the two divided molded products 1a can be obtained.

In the examples shown in FIGS. 9(e) to (h), the spacer 1 is obtained by combining the divided molded products 1a that are divided into two along the longitudinal direction. The spacer 1 may be obtained by combining a plurality of molded products divided at an arbitrary part. In this case, if at least one divided molded body has a shape having the side wall part 4 in which a plurality of arc-like peripheral surface parts 2 are connected through the waist part 3, by applying the present invention, deformation of the divided molded products in the post-molding cooling step can be prevented.

Further, when the spacer 1 is allowed to have a shape that is partially insertable into the inside of the water jacket WJ, by applying the present invention as in the case of the examples shown in FIG. 9(e) to (h), deformation in the post-molding cooling step can be suppressed.

Figure 11:
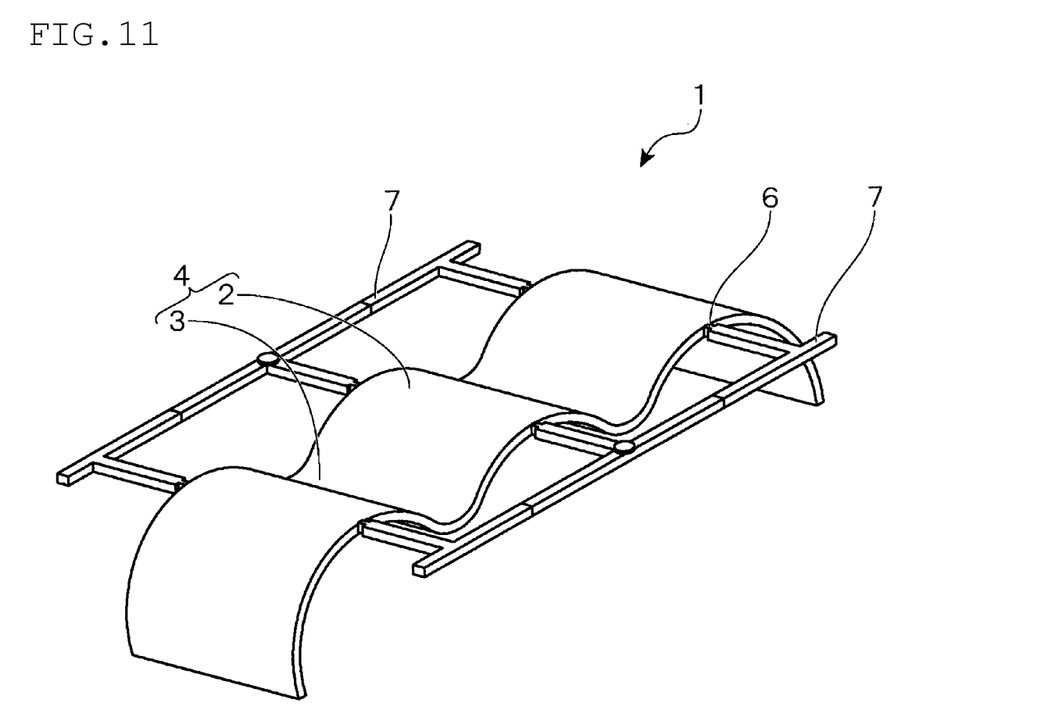
FIG. 11 is an explanatory view showing a modification example of the present invention.

As in the case of the divided molded products 1a shown in FIGS. 9(e) to (h), if the spacer 1 has a shape having the side wall part 4 in which a plurality of arc-like peripheral surface part 2 are connected through the waist part 3 and does not have a part that becomes an undercut at the time of mold opening, for example, the spacer 1 can be molded by using an injection molding die having a structure that molds the outer peripheral side of the side wall part 4 by a fixed mold and molds the inner peripheral side of the side wall part 4 by a movable mold. In this case, as shown in FIG. 11, the gate 6 may be arranged at a position that corresponds to the both ends of the spacer 1. Also by doing so, there is no need to provide draft angle on the inner circumferential surface of the spacer 1.

Accordingly, also by this embodiment, constraints caused by draft angle when designing the spacer 1 such that the temperature distribution of the bore wall BW can be optimized can be relaxed, and since burrs remaining in the spacer 1 after gate cutting and burrs that are formed along the parting line are also not formed on the inner peripheral surface side of the spacer 1, control thereof becomes facilitated. Further, when a gate cutting treatment is conducted, handling of tools used therefor is facilitated.

The documents described in the specification and Japanese application specification claiming priority under the Paris Convention are incorporated herein by reference in its entirety.

EXPLANATION OF REFERENTIAL NUMERALS

1. Spacer
1a. Divided molded products
2. Arc-like peripheral surface part
3. Waist part
4. Side wall part
5. Arc-like end surface part
6. Gate
7. Runner
7a. Reinforcing part
WJ. Water jacket

The invention claimed is:

1. A method for producing a water jacket spacer that is assembled into the inside of a water jacket provided in a water-cooled internal combustion engine in order to control the flow of cooling water, wherein the water jacket spacer has a side wall part in which a plurality of arc-like peripheral surface parts are connected through one or more waist parts;

a prescribed resin material is injection molded by using a molding die for injection molding which is configured to form an inner peripheral surface of the water jacket spacer by a mold piece wherein a draft angle of the inner peripheral surface of the water jacket spacer is a fixed angle along a mold-opening direction without any mold partition line on the inner peripheral surface and wherein resin flow channels are provided so that a plurality of gates are arranged along the longitudinal direction at a position corresponding to an outer peripheral surface of the side wall part and corresponding to the arc-like peripheral surface parts or the one or more waist parts;

the inner peripheral surface of the water jacket spacer being a surface facing a bore wall of the water-cooled internal combustion engine when the water jacket spacer is assembled into the inside of the water jacket, the outer peripheral surface of the side wall part being a surface of the side wall part opposite a surface of the side wall part facing the bore wall of the water-cooled internal combustion engine when the water jacket spacer is assembled into the inside of a water jacket; and after mold opening and ejecting, cooling is done while leaving a runner being connected to the gates in a shape of a teeth of a comb, and thereafter, the runner is cut off.

2. The method for producing a water jacket spacer according to claim 1, wherein a reinforcing part in the form of a brace is provided in a branched part of the runner.

3. The method for producing a water jacket spacer according to claim 1, wherein the water jacket spacer has a shape in which the side wall parts are arranged opposingly, and are connected to the arc-like end surface part at the both ends in the longitudinal direction.

4. The method for producing a water jacket spacer according to claim 3, wherein the water jacket spacer is obtained by molding a plurality of divided molded products including divided molded products having a side wall part in which a plurality of arc-like peripheral parts are connected through a waist part and combining these divided molded products.

5. The method for producing a water jacket spacer according to claim 4, wherein the water jacket spacer is obtained by molding divided molded products obtained by dividing the water jacket spacer into two along the longitudinal direction and combining the two divided molded products.

* * * * *